(12) United States Patent
Hyatt

(10) Patent No.: US 8,020,025 B2
(45) Date of Patent: Sep. 13, 2011

(54) POWER SAVING SCHEDULER FOR TIMED EVENTS

(75) Inventor: Edward Craig Hyatt, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 614 days.

(21) Appl. No.: 12/132,747

(22) Filed: Jun. 4, 2008

(65) Prior Publication Data

US 2009/0307519 A1   Dec. 10, 2009

(51) Int. Cl.
*G06F 1/04* (2006.01)
(52) U.S. Cl. .................... 713/502; 713/320; 718/100
(58) Field of Classification Search .................. 718/100; 455/574; 713/320, 502
See application file for complete search history.

(56) References Cited

U.S. PATENT DOCUMENTS

| | | | |
|---|---|---|---|
| 5,625,821 A * | 4/1997 | Record et al. ................. | 718/100 |
| 6,965,763 B2 | 11/2005 | Bussan et al. | |
| 2003/0153368 A1 | 8/2003 | Bussan et al. | |
| 2005/0015766 A1 | 1/2005 | Nash et al. | |
| 2009/0183157 A1 | 7/2009 | Tran et al. | |

FOREIGN PATENT DOCUMENTS

| | | |
|---|---|---|
| GB | 2 439 104 | 12/2007 |
| WO | 2005/106623 | 11/2005 |

OTHER PUBLICATIONS

International Search Report and Written Opinion for corresponding application No. PCT/US2008/084293 dated Apr. 13, 2010.

* cited by examiner

*Primary Examiner* — Thomas Lee
*Assistant Examiner* — Xuxing Chen
(74) *Attorney, Agent, or Firm* — Renner, Otto, Boisselle & Sklar, LLP

(57) ABSTRACT

The disclosed system and methods include a power saving scheduler that maintains timed events in an event table. Each timed event has an associated tolerance period within which the event should begin execution following a trigger, and a timestamp indicating a scheduled execution time for the event. When a device is in a low-power sleep mode, a trigger may wake up the device to a wake state. The power scheduler then accesses the event table of upcoming timed events, and reorders the event table from the event having the shortest tolerance period to the event having the longest tolerance period. Each event for which the timestamp is within the tolerance period as measured from the trigger time is executed. After a plurality of such events are executed, the device may return to the sleep mode.

18 Claims, 5 Drawing Sheets

Current (Trigger) Time = 100 ms

Event Table 42

| Trigger 45 | Tolerance 46 | Time-stamp 47 | Duration 48 | Priority 49 | Response Task 50 |
|---|---|---|---|---|---|
| AccelSample | 2 | 102 | 20 | 6 | SportsAppProcess |
| AID Poll | 500 | 185 | 10 | 5 | SystemBusProcess |
| CODEC | 1 | 100 | 25 | 9 | WalkmanProcess |
| FileSystem | 20 | 100 | 3000 | 4 | FileServerProcess |
| GSMTick | 1 | 100 | 200 | 9 | GSMProcess |
| Key | 5 | 100 | 200 | 8 | KeyboardProcess |
| LightSensor | 10000 | 6422 | 10 | 1 | DisplayProcess |
| UICallback | 10 | 1710 | 5 | 7 | MMIProcess |
| ⋮ | ⋮ | ⋮ | ⋮ | ⋮ | ⋮ |

FIG. 3

Current (Trigger) Time = 100 ms

Event Table 42

| Trigger 45 | Tolerance 46 | Timestamp 47 | Duration 48 | Priority 49 | Response Task 50 |
|---|---|---|---|---|---|
| CODEC | 1 | 100 | 25 | 9 | WalkmanProcess |
| GSMTick | 1 | 100 | 200 | 9 | GSMProcess |
| AccelSample | 2 | 102 | 20 | 6 | SportsAppProcess |
| Key | 5 | 100 | 200 | 8 | KeyboardProcess |
| UICallback | 10 | 1710 | 5 | 7 | MMIProcess |
| FileSystem | 20 | 100 | 3000 | 4 | FileServerProcess |
| AIDPoll | 500 | 185 | 10 | 5 | SystemBusProcess |
| LightSensor | 10000 | 6420 | 10 | 1 | DisplayProcess |
| : | : | : | : | : | : |

FIG. 5

Current (Trigger) Time = 100 ms

Event Table 42

| Trigger 45 | Tolerance 46 | Timestamp 47 | Duration 48 | Priority 49 | Response Task 50 |
|---|---|---|---|---|---|
| CODEC | 1 | 100 | 25 | 9 | WalkmanProcess |
| GSMTick | 1 | 100 | 200 | 9 | GSMProcess |
| AccelSample | 2 | 102 | 20 | 6 | SportsAppProcess |
| Key | 5 | 100 | 200 | 8 | KeyboardProcess |
| UICallback | 10 | 1710 | 5 | 7 | MMIProcess |
| FileSystem | 20 | 100 | 3000 | 4 | FileServerProcess |
| AIDPoll | 500 | 185 | 10 | 5 | SystemBusProcess |
| LightSensor | 10000 | 6422 | 10 | 1 | DisplayProcess |
| : | : | : | : | : | : |

FIG. 6

Current (Trigger) Time = 100 ms

Event Table 42

| Trigger 45 | Tolerance 46 | Timestamp 47 | Duration 48 | Priority 49 | Response Task 50 |
|---|---|---|---|---|---|
| UICallback | 10 | 1710 | 5 | 7 | MMIProcess |
| : | : | : | : | : | : |

FIG. 7

POWER SAVING SCHEDULER FOR TIMED EVENTS

TECHNICAL FIELD OF THE INVENTION

The technology of the present disclosure relates generally to electronic devices, and more particularly to an improved power saving scheduler for scheduling the execution of timed events to provide more efficient power consumption.

DESCRIPTION OF THE RELATED ART

Electronic devices, and portable electronic devices in particular, such as mobile telephones, media players, personal digital assistants (PDAs), and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera, an Internet browser for accessing news and information, an audiovisual media player, a messaging device (text, audio, and/or visual messages), a gaming device, a personal organizer, and have other functions as well.

With this increased functionality, one issue associated with portable electronic devices is how to maximize battery life. Because users of portable electronic devices often are away from a power source, it is desirable for a battery to operate for as long as possible between charges. One way to conserve power is to place the device in a low-power "sleep" mode during periods of relative inactivity. In the sleep mode, much of the device hardware is shut down to conserve power.

During the active mode when the device is fully functioning, the device processor or CPU maintains a system clock that controls the timing of various device operations. In particular, in a typical configuration a timer handler may keep track of various timed events, each of which has its own associated timer. These various timers, during active device function, may be tied or synchronized to the CPU or system clock. Timed events may be defined by a user and scheduled. For example, a user may schedule a display refreshing event, an alarm, or the like, each of which may be a one-time or occasionally recurring scheduled event. Other timed events may be periodic, recurring repeatedly at a fixed interval. Periodic events may also be user defined, or they may be pre-programmed into the device hardware configuration or software. Periodic events may include, for example, checking a cell tower for incoming calls, checking the device temperature, checking for an accessory state or presence, and the like. Regardless of the manner by which timed events are inputted into the device, the timer handler may generate separate timers for each timed event. The various timers may then be tied to the system clock when the device is in the active, wake state. The various timed events may each require a differing amount of time to perform, and may be prioritized should the execution of multiple events overlap.

When the device enters sleep mode, however, the CPU and its associated system clock typically shut down as part of the power conservation process. During sleep mode, a separate low-power hardware timer may maintain a low frequency "tick" so that time measuring is preserved. In a conventional configuration, the hardware timer may maintain approximately a 1 ms pulse. In this manner, timed events scheduled for future execution may remain on schedule, their timers being tied to the hardware timer while the device is in the sleep mode.

When in sleep mode, various events may trigger the device to "wake up" from the sleep mode. Such events may include asynchronous events that occur without regularity. For example, a mobile telephone may wake up when a call is received, or when a user presses a key on a keypad. Timed events also may provide a wakeup trigger, for example when the hardware timer has "ticked" to the scheduled execution time of a timed event.

When an interrupt or wakeup event occurs, whether the wakeup trigger is an asynchronous, scheduled, or periodic event, wakeup initially includes powering up the CPU and its associated system clock. There typically is a delay for the CPU clock to ramp up to speed and stabilize, and then the processor may execute the program code associated with the interrupt event. When executing the interrupt is complete, the device may return to the sleep mode. The delay associated with powering up the CPU and system clock may result, however, in inefficient use of both waking time and sleep time. In addition, waking up the CPU itself requires considerable current, and, therefore, current may be wasted even using a sleep mode if interrupt events are not scheduled in an efficient manner. In particular, it tends to waste power to repeatedly alternate between wake and sleep states to execute an individual (or few) timed events. Rather, it is preferable to schedule the execution of numerous timed events to overlap so that the CPU does not need to be raised from sleep mode over and over again to handle multiple events. Current methods of scheduling the execution of timed events, however, have proven deficient in saving meaningful amounts of power.

SUMMARY

To improve the consumer experience with portable electronic devices, there is a need in the art for an improved system and method for scheduling the execution of timed events to increase overlap and reduce current waste. The system and methods described herein increase the average total time a device spends in a low-power sleep mode, while substantially reducing the number of wakeup events that require powering up the CPU. In this manner, the execution of multiple timed events is consolidated to obviate the need for repeatedly alternating between the wake and sleep states. The real time response constraints associated with the timed events are still satisfied.

The disclosed system and methods include a power saving scheduler that maintains a plurality of timed events in an event table. Each timed event may be specified by a trigger, a responsive task, and other execution parameters. In particular, each event may have an associated tolerance period within which the event should begin execution following a trigger. For example, certain events may have a relatively short tolerance, for example on the order of a few milliseconds or less, which indicates that they should be executed relatively promptly after a trigger. Other events may have a relatively long tolerance, for example on the order of several hundred milliseconds or more, which indicates that they need not be executed promptly following a trigger.

When a device is in sleep mode, an initial trigger may wake up the device causing the powering up of the CPU and system clock as is conventional. The initial trigger may be any event, whether an asynchronous, scheduled, or periodic event as described above. The power saving scheduler accesses the event table of upcoming timed events, and reorders the event table from the event having the shortest tolerance period to the event having the longest tolerance period. In other words, the power saving scheduler reorders the event table from events that should be executed promptly to those that may be delayed.

For each event, a timestamp may constitute the scheduled time for execution of the event. The event timestamp may be compared to the current trigger time. If for a given event the difference between the scheduled timestamp and the current trigger time is less than or equal to the tolerance time, then the event will be executed during the current active period. In other words, a timed event will be executed if its timestamp (scheduled time) is within the tolerance period, as measured from the wakeup trigger time. This determination may be performed as to each event in the event table to identify all those events that are to be executed during the current active period. After a plurality such events are executed, the device may return to the sleep mode. Events that do not satisfy the above conditions may be delayed until a subsequent active period following the additional sleep mode period. In this manner, a plurality of timed events may be grouped together for more efficient execution, thereby reducing the total number of wakeups required and increasing the average time spent in the low-power sleep mode.

Therefore, according to one aspect of the invention, an electronic device comprises an event table for storing timed events, wherein for each timed event the event table includes a tolerance period indicating a time period from a trigger within which to execute the timed event, and a respective timestamp indicating a scheduled execution time for the timed event. A controller is configured to receive a trigger at a trigger time, and further is configured upon receiving the trigger to execute a plurality of timed events in the event table each for which the respective timestamp is within the tolerance period as measured from the trigger time.

According to one embodiment of the electronic device, the electronic device further comprises a timer handler for generating entries of timed events in the event table.

According to one embodiment of the electronic device, the electronic device further comprises a scheduler comprising the event table and the timer handler.

According to one embodiment of the electronic device, the timer handler deletes from the event table entries for timed events executed by the controller.

According to one embodiment of the electronic device, the controller is further configured to cause the electronic device to enter a low-power sleep mode, and to cause the electronic device to return to a wake state upon receiving the trigger.

According to one embodiment of the electronic device, the controller is further configured to cause the electronic device to reenter the sleep mode after executing a plurality of timed events in the event table each for which the respective timestamp is within the tolerance period as measured from the trigger time.

According to one embodiment of the electronic device, the electronic device further comprises a hardware timer separate from the controller that measures time while the electronic device is in the sleep mode.

According to one embodiment of the electronic device, the electronic device is a mobile telephone.

According to another aspect of the invention, a method of executing timed events in a portable electronic device comprises the steps of generating an event table for storing timed events, wherein for each timed event the event table includes a tolerance period indicating a time period from a trigger within which to execute the timed event, and a respective timestamp indicating a scheduled execution time for the timed event. The method further comprises receiving a trigger at a trigger time, and executing a plurality of timed events in the event table each for which the respective timestamp is within the tolerance period as measured from the trigger time.

According to one embodiment of the method of executing timed events, the method further comprises, upon receiving the trigger, sorting the timed events in the event table from the shortest tolerance period to the longest tolerance period.

According to one embodiment of the method of executing timed events, for each timed event the invent table includes a priority, the method further comprising sorting timed events having the same tolerance period from highest priority to lowest priority.

According to one embodiment of the method of executing timed events, the method further comprises deleting the executed timed events from the event table.

According to one embodiment of the method of executing timed events, the method further comprises retaining the non-executed events in the event table.

According to another aspect of the invention, a method of operating an electronic device comprising the steps of generating an event table of timed events, wherein for each timed event the event table includes a tolerance period indicating a time period from a trigger within which to execute the timed event, and a respective timestamp indicating a scheduled execution time for the timed event. The method further comprises entering a low-power sleep mode, receiving a wakeup trigger at a trigger time, powering up from the sleep mode to a wake state, and executing a plurality of timed events in the event table each for which the respective timestamp is within the tolerance period as measured from the trigger time.

According to one embodiment of the method of operating an electronic device, the method further comprises returning to the sleep mode after executing the plurality of timed events in the event table each for which the timestamp is within the tolerance period as measured from the trigger time.

According to one embodiment of the method of operating an electronic device, the step of receiving the wakeup trigger comprises receiving an input from a source external to the electronic device.

According to one embodiment of the method of operating an electronic device, receiving the wakeup trigger comprises initiating the execution of a timed event in the event table.

According to one embodiment of the method of operating an electronic device, the electronic device has a controller including a system clock, and the step of entering the sleep mode comprises powering down the controller and the system clock.

According to one embodiment of the method of operating an electronic device, the electronic device has a hardware timer, the method further comprising measuring time with the hardware timer while the electronic device is in the sleep mode.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

BRIEF DESCRIPTION OF THE DRAWINGS

FIG. 3 depicts an exemplary event table of timed events.

FIG. 5 depicts the exemplary event table of FIG. 3, wherein the events are sorted by tolerance period.

FIG. 6 depicts the exemplary event table of FIG. 5, wherein events to be executed during a current wake state are highlighted.

FIG. 7 depicts the exemplary event table of FIGS. 3 and 5-6 following the execution of multiple timed events.

DETAILED DESCRIPTION OF EMBODIMENTS

Figure 1:
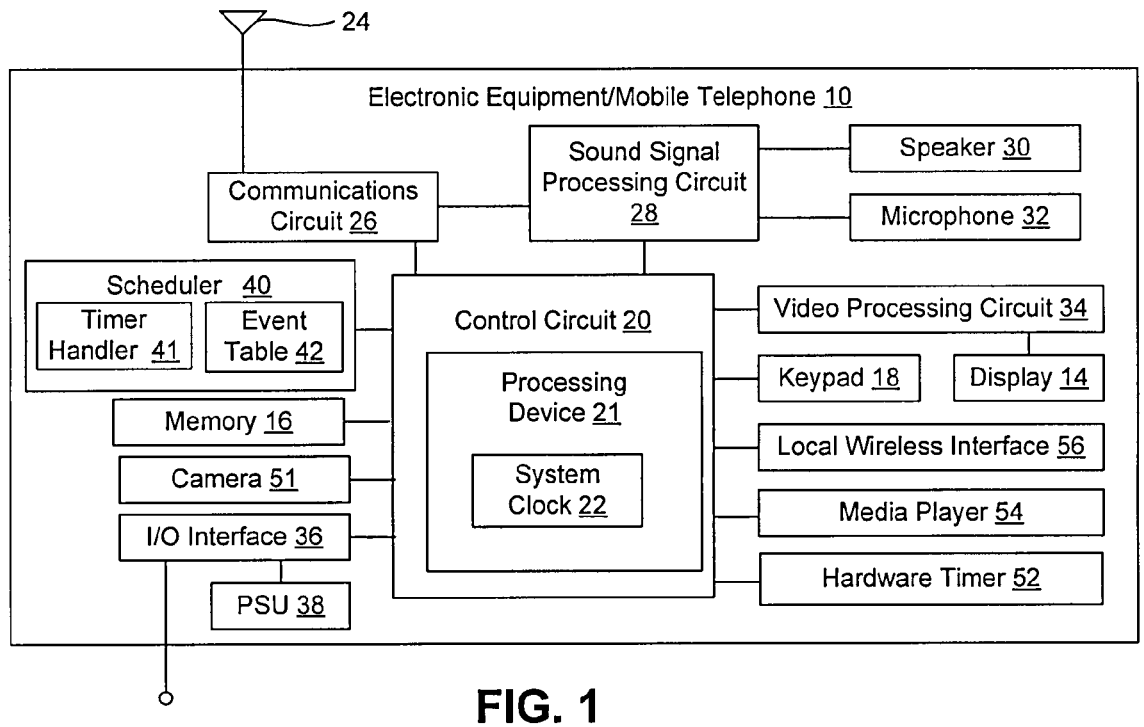
FIG. 1 is a schematic block diagram depicting operative portions of a mobile telephone as an exemplary electronic device incorporating the disclosed scheduler.

Embodiments of the present invention will now be described with reference to the drawings, wherein like reference numerals are used to refer to like elements throughout. It will be understood that the figures are not necessarily to scale.

The following description is made in the context of a conventional mobile telephone. It will be appreciated that the invention is not intended to be limited to the context of a mobile telephone and may relate to any type of appropriate electronic device, examples of which include a computer, a media player, a gaming device, or similar. For purposes of the description herein, the interchangeable terms "electronic equipment" and "electronic device" also may include portable radio communication equipment. The term "portable radio communication equipment," which sometimes hereinafter is referred to as a "mobile radio terminal," includes all equipment such as mobile telephones, pagers, communicators, electronic organizers, personal digital assistants (PDAs), smartphones, and any communication apparatus or the like.

FIG. 1 is a schematic block diagram of operative portions of an exemplary mobile telephone 10. The mobile telephone 10 may include a primary control circuit 20 that is configured to carry out overall control of the functions and operations of the mobile telephone 10. The control circuit 20 may include a processing device 21, such as a CPU, microcontroller or microprocessor. The control circuit 20 and/or processing device 21 may comprise a controller that may execute program code embodied within the mobile telephone to control the various device functions. Various device functions commonly are referred to herein as "events".

The CPU 21 may be associated with a system clock 22 as is conventional. The system clock 22 may measure time for the purpose of triggering the execution of various timed events. It will be appreciated that although the system clock 22 is depicted as being associated with the CPU, the system clock may be a separate component. In addition, system clock functions may be performed by a single system clock, as shown, or distributed over multiple clock devices.

In a conventional system, scheduled and periodic timed events are triggered according to their scheduled execution time as determined with reference to the system clock. There may be a short delay between a trigger and the actual execution of the event, but the timing of execution tends to be essentially fixed. As further described below, however, as a practical matter there may not be a need to perform a given event precisely as scheduled. The timing of an event may have a tolerance period, or a range of permissible time to respond to a trigger. Within such tolerance, the actual execution of the event may be shifted from the scheduled execution time. The actual execution time may be shifted earlier or later from the scheduled time within the tolerance.

The present invention makes use of these tolerances to modify the precise time of execution of timed events to increase the number of events that may be executed upon waking an electronic device, such as mobile telephone 10, from a sleep mode. The system, therefore, more efficiently uses the active time once the device has been wakened. The result is relatively more time spent in the power saving sleep mode and fewer waking events, while still satisfying execution tolerance constraints of the various timed events.

Referring again to FIG. 1, the mobile telephone 10 may include a power saving scheduler 40 for carrying out the features of the invention. The scheduler 40 may be embodied as executable program code that is resident in and executed by the mobile telephone 10. Scheduler 40 may be executed by the control circuit 20 and/or processing device 21, and may be a stand-alone software application or form a part of a software application that carries out additional tasks related to the mobile telephone 10. It will be apparent to a person having ordinary skill in the art of computer programming, and specifically in application programming for mobile telephones or other electronic devices, how to program a mobile telephone to operate and carry out logical functions associated with the scheduler 40. Accordingly, details as to specific programming code have been left out for the sake of brevity. Also, while the code may be executed by control circuit 20 in accordance with an exemplary embodiment, execution of scheduler 40 also could also be carried out via dedicated hardware, firmware, software, or combinations thereof.

The power saving scheduler 40 may monitor scheduled or timed events using a timer handler 41 and an event table 42. As stated above, timed events may be created via a variety of mechanisms. For example, they may be user defined, or the result of hardware configuration or software programming. Timer handlers are for the most part conventional. Regardless of the manner of creation of a timed event, timer handler 41 generates a timer for the event and a pointer that marks the event address in memory. The pointer provides a memory location by which the CPU may link to the event for execution. The timer and pointer may be synchronized to the system clock, which provides a reference clock for counting down the event timer. When the event timer has exhausted, the event may be executed by the control circuit or CPU 20, 21. In similar fashion, timer handler 41, in addition to creating timers and event pointers, may delete or alter them in response to user or other inputs. Although timer handler 41 is depicted as being part of scheduler 40, it will be appreciated that the timer handler may be a separate component.

In addition to conventional functions, in the context of the current invention the timer handler 41 also may generate an entry for each timed event in the event table 42. As further described below, event table 42 provides a compiled list in memory of the various timed events scheduled to be executed by the electronic device. As shown, the event table is depicted as being stored within the scheduler 40, but the event table also may be stored in memory external to the scheduler 40. For example, the event table may be stored in a memory 16 (see FIG. 1).

Figure 2:
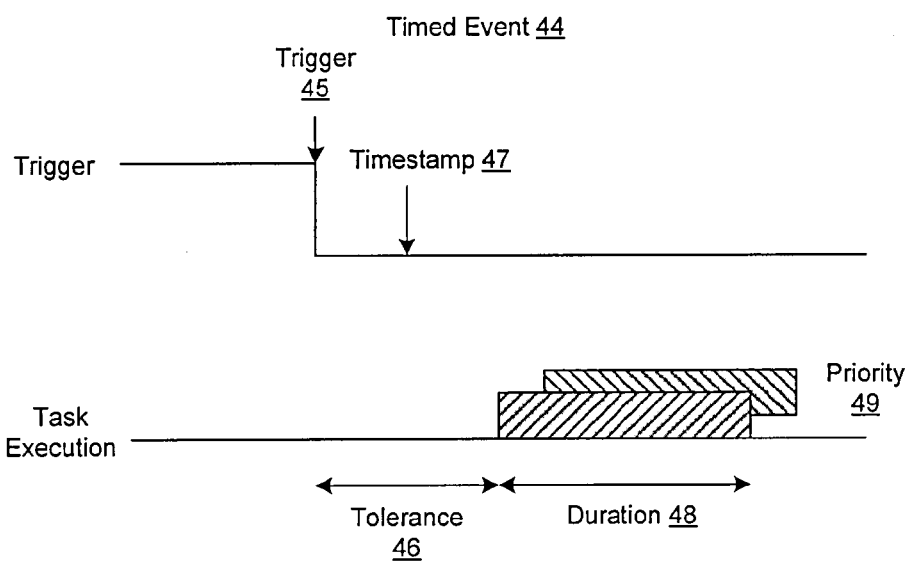
FIG. 2 is a schematic diagram depicting an exemplary execution of a timed event.

FIG. 2 is a schematic diagram depicting an exemplary execution of a timed event 44. Each event may be characterized by the following parameters: (a) a trigger 45; (b) a tolerance period 46; (c) a timestamp 47; (d) a duration 48; (e) a priority 49; and (f) a responsive task 50. For example, suppose a device function has been programmed to measure device temperature every 20 ms to detect potential overheating issues. For such a periodic event, the trigger time is set by the preprogrammed time period interval. Other events may have other triggers, which may or may not be periodic or have a preprogrammed time. Events external to the electronic device may provide the wakeup trigger. For example, a calling mode may be triggered by the receipt of an incoming call. Other events may be triggered by a user input via an input device, such as the pressing of a key on a keypad. It will therefore be appreciated that the various device functions may have various corresponding triggers.

Referring to FIG. 2, an exemplary execution of a timed event 44 is depicted graphically. The top line depicts the triggering of the timed event, which includes the trigger 45 which triggers the execution of the event. Once an event is triggered, there may be a short processing delay to begin actual execution of the event. The event, therefore, also includes a respective timestamp 47 that represents the moment in time after the trigger at which the event is scheduled to execute.

FIG. 2 depicts an exemplary task execution on the second line in accordance with embodiments of the present invention. Although the task is scheduled to execute at the timestamp 47, as stated above certain tasks as a practical matter need not execute precisely at the timestamp. Rather, there may be a tolerance to the execution time, or a permissible range of time following the trigger within which execution may begin. For example, although a device function may have been programmed to measure device temperature every 20 ms, it may be satisfactory as a practical matter to measure device temperature as much as 22 ms from the previous measurement. The tolerance period, therefore, is 2 ms, which is the permissible time after the trigger that the measurement may be made. In FIG. 2, a tolerance period 46 is shown. Note that the timestamp 47 falls within the tolerance period 46, or in other words, the tolerance period exceeds the time difference between the timestamp and the trigger. This means that the actual execution of the event may be delayed somewhat to the end of the tolerance period without sacrificing the efficacy of the event 44. This is shown in FIG. 2, for example, in which the actual execution of the event does not occur at the timestamp, but rather occurs at the end of the tolerance period.

Also as seen in FIG. 2, the event has a duration 48, which represents the time required to complete execution of the event. The event also may have a priority 49, which represents the task priority relative to other tasks invoked at the same time. In FIG. 2, a lower priority task is being represented as being behind a higher priority task. Note that in this example, the execution of the lower priority task commences after execution of the higher priority task has commenced.

As stated above, the various timed events may be entered into the event table 42. FIG. 3 depicts an exemplary event table 42 comprising a list of numerous scheduled or timed events. It will be appreciated that the events identified in the event table of FIG. 3 are exemplary. Any timed event may be entered into the event table. In addition, device functions and processes may continuously add events to the event table. As stated above, scheduled events may be user defined or a result of hardware configuration or software programming. Events may be one-time occurring events, multiple-time occurring events scheduled at precise non-periodic times, or periodic events that are set to occur at regular intervals. Regardless of the manner by which a timed event is created, the timer handler 41 may generate a timer for the event, generate a pointer to establish an address for the event in memory, and create an entry for the event in the event table 42.

As seen in the event table of FIG. 3, similar to the parameters shown in FIG. 2 for a single event, each event listed in the event table has a respective trigger 45, a tolerance period 46, a timestamp 47, a duration 48, a priority 49, and an associated response task 50. As stated above, the tolerance is a permissible range of time after a trigger within which to begin execution of the event. The timestamp is the time at which the event is actually scheduled to occur relative to the current time. For example, time values in the event table may be in units of milliseconds measured based upon the CPU or system clock. For example, in FIG. 3 it is presumed that the current time (referred to herein as $T_o$) is 100 ms (as measured from a reference time). Any event with a timestamp (referred to herein as $T_s$) also of 100 ms is essentially scheduled for immediate execution. In other words, $T_s-T_o=0$, which indicates that the event is scheduled for essentially immediate execution. In the example of FIG. 3, the CODEC, FileSystem, GSMTick, and Key triggered events all have a timestamp of 100, which indicates they are scheduled essentially for immediate execution. Those events whose timestamp does not equal the current time are scheduled to execute at some future time of $T_s-T_o$ ms. For example, the event triggered by AccelSample is scheduled to execute in 2 ms, the event triggered by the AIDPoll is scheduled to execute in 85 ms, and so on.

The duration 48 of a timed event is the time to complete the execution of the task. The priority 49 indicates the relative priority of an event relative to other events. The higher the priority number, for example, the higher the priority of an event. The response task 50 represents the specific operational task or function to be performed in response to the trigger.

The event table of FIG. 3 represents how the event table may be maintained when the device is in the active or fully operational mode. In this example, the event table is maintained alphabetically by triggering event. As new events are scheduled, either as user defined or hardware/program created events, they may be added to event list in the proper alphabetical orientation. It will be appreciated that other ordering schemes may be employed, such as by order of entry, timestamp, priority, length of tolerance period etc.

In the fully active mode, events typically are executed in accordance with their respective timestamps. During periods of relative inactivity, the device may be powered down into a sleep mode in which various device functions and components are powered down. Referring again to FIG. 1, the powered down components may include the CPU 21 and the system clock 22. Mobile telephone 10 may also include a hardware timer 52 that constitutes a low-power timing device that measures time while the device is in sleep mode. The hardware timer may generate clock "ticks" to keep track of time, which, in a conventional configuration, may be occur at 1 ms intervals. It will be appreciated that the frequency of the clicks of the hardware timer may be varied. The measuring of time by the hardware timer 52 permits timed events to remain on schedule during the sleep mode.

Any device function may act as a trigger to "wake up" the device from the sleep mode. The wakeup trigger may be initiating the execution of a timed event already present in the event table. In such a case, the trigger for a timed event may be initiated based on the clock signals generated by the low-power hardware timer 52. The wakeup trigger, however, need not be a scheduled or timed event. The wakeup trigger may be an input from a source external to the electronic device. For example, the wakeup trigger may be a non-scheduled event, such as an incoming call, a user input (e.g., depressing a key), and the like. Regardless of the wakeup trigger, the power saver scheduler 40 may cause a plurality of timed events in the event table 42 to be executed without returning in and out of sleep mode. In particular, a single wakeup trigger may act as the trigger for each of the multiple timed events to be executed during the wake state.

Figure 4:
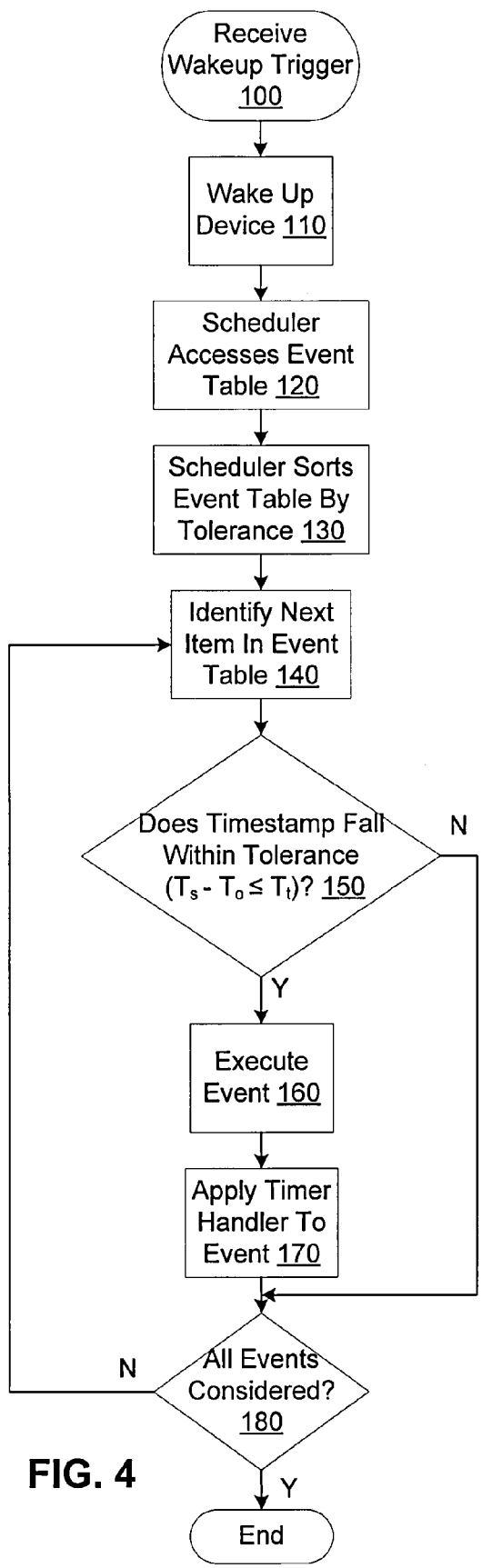
FIG. 4 depicts an overview of an exemplary method of executing timed events.

FIG. 4 depicts an overview of an exemplary method of executing scheduled events when the electronic device experiences a wakeup trigger while in sleep mode. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100 in which a wakeup trigger is received. As stated above, the wakeup trigger may be any event that requires the activation of the processor. The wakeup event could be an unscheduled event such as an incoming call or a user key input. The event also may be a timed event already listed in the event table, whose execution may be determined as imminent based on the timekeeping of the hardware timer. At step 110, the wakeup trigger causes the device, including the CPU and CPU system clock, to wake up.

Once the device has awoken, at step 120 the power saving scheduler may access the event table. At this stage, the event table may be in the form exemplified by FIG. 3, in which the event list is maintained alphabetically or by some other order. At step 130, the scheduler sorts the event table by tolerance, listing the events from shortest tolerance to longest tolerance. Accordingly, those items with the lowest tolerance, thus requiring more immediate attention, are listed first. The scheduler may employ secondary criteria to sort the list when two or more events have the same tolerance. For example, higher priority tasks may be listed before lower priority tasks, or tasks having a timestamp closer to the current trigger time may be listed before events having later timestamps. Other secondary sorting criteria may be employed. It will be appreciated that the event table may be sorted by tolerance, and other table optimizations may also be performed, while the CPU is awake to minimize overhead when an event occurs during the sleep mode. In other words, the event table may be maintained in the sorted order by tolerance as new events are added, instead of sorting the event table by tolerance once the device is awakened from the sleep mode.

At step 140, the scheduler may identify the next item in the event table, which at this initial stage would actually be the first listed item following the sorting process.

At step 150, for the identified item the scheduler determines whether the respective timestamp, the scheduled time for executing the event, falls within the tolerance period, or the period after the trigger within which the event may be performed. Mathematically, the scheduler performs the following calculation and determines if it is satisfied:

$$T_s - T_o \leq T_t,\qquad\text{Eq. 1}$$

where $T_s$ is the timestamp (scheduled time), $T_o$ is the current trigger time as may be measured by the system clock (which now is active in the wake state), and $T_t$ is the tolerance period.

The scheduler, therefore, determines whether the difference between the timestamp and the trigger time is less than or equal to the tolerance period. In other words, if the timestamp is within the tolerance period as measured from the trigger, then the event is executed. Execution of the event occurs at step 160.

At step 170, the timer handler is applied to the executed event and its associate timer. For example, a given event under this method may be executed in close time proximity to the trigger as determined at step 150. The execution time, therefore, may not occur at the specified timestamp. If the timestamp were maintained in the event table, another trigger may be initiated and the event executed again unnecessarily for the second time. The timer handler prevents such unnecessary triggers by altering the event table and associated timers based upon event executions. Typically, for example, the timer handler may delete the event from the table, and also delete the event's associated timer and pointer from memory. If the event is a one-time scheduled event, the timer handler may permanently delete the event and its associated timer and pointer. If the event is to be executed again, such as in the case of a multi-scheduled or periodic event, the timer handler at some future time may reset the timer and pointer for that event and apply a new timestamp based upon the future scheduled execution. Other actions of the timer handler may be employed.

Considering again step 150, if an event does not satisfy the above calculation, i.e., the scheduled timestamp is outside the tolerance period, then the event is not executed. The event may remain listed in the event table unaltered by the timer handler.

At step 180, the scheduler determines whether there are additional events to consider. The number of events to be considered by the scheduler may be varied. For example, the scheduler may consider all events present in the event table at the time of the trigger. Alternatively, a set portion of the event table may be considered, or event consideration may be cut off by timestamp or tolerance period as measured from the time of the trigger. It will be appreciated that these are but examples, and other cutoff criteria may be applied by the scheduler. If there are additional events to consider, the method may return to step 140 to identify the next event in the table. The scheduler may then determine whether the next event should be executed. At step 180, once it is determined that all applicable events have been considered, the method may terminate. For example, the device may return to sleep mode. Alternatively, the device may remain in the wake state if device functions (calling, key inputs, etc.), are still being performed.

In this manner, a single trigger may result in the execution of numerous timed events. The events also are all executed within a common wake state.

The method may be further explained with reference to the exemplary event table depicted in FIG. 3. As stated above, FIG. 3 depicts the event table as events are initially placed therein by the timer handler, with the events sorted alphabetically (or in some comparable default order). FIG. 3 may represent the event table when the device is in a low-power sleep mode. When a triggering event is received that requires CPU activation, the device wakes up. For example, a wakeup trigger may be provided automatically by the CODEC procedure, which is a high-priority timed event scheduled to execute at the current time of 100 ms.

Once the device is awake, the scheduler first sorts the event table by tolerance period because, regardless of the triggering event, events with the shortest tolerance period require more prompt attention, whereas events with longer tolerance periods may be delayed. Alternatively, as stated above, sorting by tolerance may be performed while the CPU is awake as new events are added to it, instead of sorting it once the device is awakened from the sleep mode. FIG. 5 depicts the event table sorted by tolerance period from shortest to longest tolerance. For example, the CODEC and GMSTick operations have a tolerance only of 1 ms, going up to the LightSensor operation which has a tolerance of 10000 ms.

In this example, the current time, which also is the trigger time, is 100 ms as measured from a reference time, which may be generated by the system clock or hardware timer. Certain events in the event table have a timestamp (scheduled execution time) of 100 ms, the same as the current trigger time. Such events are thus scheduled for immediate execution, and, therefore, may provide the trigger to wake the device. Note, however, that the tolerance also may be considered in timing the actual execution of an event. For example, the CODEC operation may be scheduled for immediate execution, but having a tolerance of 1 ms, its execution may be delayed to time 101 ms, or 1 ms beyond the current (trigger) time. Events with longer tolerances and further timestamps may be executed sooner than scheduled. For example, the AIDPoll event is scheduled to execute at time 185 ms, but has a tolerance of 500 ms from the trigger. Accordingly, assuming a current trigger time of 100 ms, the AIDPoll event may be executed anywhere from between time 100 ms to time 600 ms. The execution time of the AIDPoll thus may be either sooner or delayed with respect to the scheduled timestamp.

For each event, the scheduler next determines which events satisfy the condition that the scheduled timestamp is within the tolerance period (Eq. 1 above). For example, for the CODEC operation, the difference between the timestamp and the current trigger time is 0 ms, which is less than the tolerance of 1 ms. Accordingly, the CODEC operation will be executed. As another example, for the AIDPoll operation the difference between the timestamp (185 ms) and the current trigger time (100 ms) is 85 ms. 85 ms is less than the tolerance of 500 ms, and, therefore, the AIDPoll operation also will be executed.

A similar calculation may be performed as to the other events in the event table. FIG. 6 depicts the event table of FIG. 5 in which all events to be executed are shaded. Indeed, only the UlCallback operation does not satisfy the condition that the scheduled timestamp is within the tolerance period as measured from the trigger. As a result, the UlCallback operation would not be executed during the current wakeup period. As depicted in FIG. 7, the executed events may be removed from the event table by the timer handler. The UlCallback operation remains in the event table for later execution. Having executed all events as determined by the disclosed method, the device may return to sleep mode and await the next trigger event.

In this manner, a plurality of tasks are grouped together and executed within a single wakeup period. Tasks deemed unsuitable for execution during the current wakeup period may be retained in the event table for future execution. Thus, the time period spent in the high-power wake state is utilized more efficiently to execute multiple scheduled events without having to go in and out of sleep mode. As a result, time spent in the low-power sleep mode is increased, and the number of wakeup events is reduced while maintaining the execution time requirements of the various events. The disclosed method, therefore, provides for improved power management and usage as compared to current systems and methods for executing timed events.

It will be appreciated that additional events may be added to the resultant event table depicted in FIG. 7. For example, some of the events in FIGS. 5 and 6 may be periodic or recurring events that may need to be executed again at some future time. Such events may be reentered into the event table with new timestamps. In addition, a user, device programs, etc. may generate new scheduled events that may be entered into the event table. The timer handler may perform the function of updating the event table.

Referring again to FIG. 1 and additionally to FIG. 8, additional components of the exemplary mobile telephone 10 will now be described. For the sake of brevity, generally conventional features of the mobile telephone 10 will not be described in great detail herein.

Figure 8:
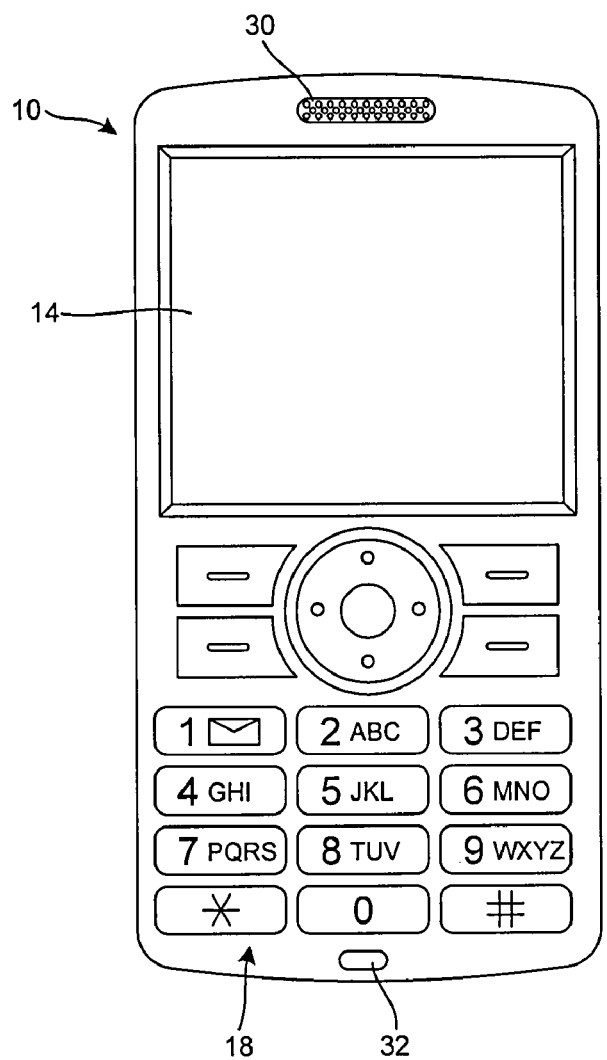
FIG. 8 is a schematic diagram of the mobile telephone of FIG. 1

FIG. 8 is a schematic diagram depicting an exemplary mobile telephone 10 having operative portions as depicted in FIG. 1. Although the exemplary mobile telephone is depicted in FIG. 1 as having a "block" or "brick" configuration, the mobile telephone may have other configurations, such as, for example, a clamshell, pivot, swivel, and/or sliding cover configuration as are known in the art.

The mobile telephone 10 includes a communications circuit 26 that enables the mobile telephone 10 to establish a call and/or exchange signals with a called/calling device, typically another mobile telephone or landline telephone, or another electronic device. The mobile telephone 10 also may be configured to transmit, receive, and/or process data such as text messages (e.g., colloquially referred to by some as "an SMS," which stands for short message service), electronic mail messages, multimedia messages (e.g., colloquially referred to by some as "an MMS," which stands for multimedia message service), image files, video files, audio files, ring tones, streaming audio, streaming video, data feeds (including podcasts) and so forth.

The communications circuit 26 also may include radio circuitry for coupling to an antenna 24. The radio circuitry of the communications circuit 26 includes a radio frequency transmitter and receiver for transmitting and receiving signals via the antenna 24 as is conventional. The mobile telephone 10 further includes a sound signal processing circuit 28 for processing audio signals transmitted by and received by the communications circuit 26. Coupled to the sound processing circuit are an audible speaker 30 and microphone 32 that enable a user to listen and speak via the mobile telephone 10 as is conventional.

Mobile telephone 10 has a display 14 that displays information to a user regarding the various features and operating state of the mobile telephone 10, and displays visual content received by the mobile telephone 10 and/or retrieved from a memory. The display 14 may be coupled to the control circuit 20 by a video processing circuit 34 that converts video data to a video signal used to drive the various displays. The video processing circuit 34 may include any appropriate buffers, decoders, video data processors and so forth. The video data may be generated by the control circuit 20, retrieved from a video file that is stored in a memory 16, derived from an incoming video data stream received by the communications circuit 26 or obtained by any other suitable method.

A keypad 18 provides for a variety of user input operations. For example, keypad 18 typically includes alphanumeric keys for allowing entry of alphanumeric information such as telephone numbers, phone lists, contact information, notes, etc. In addition, keypad 18 typically includes special function keys such as a "send" key for initiating or answering a call, and others. Some or all of the keys may be used in conjunction with the display as soft keys. Keys or key-like functionality also may be embodied as a touch screen associated with the display 14.

Mobile telephone 10 may include a camera function 51. The memory 16 may store various device functions as executable program code, as well as various media objects. The media objects may include digital photographs taken using the camera function 51. A media player 54 may be employed to play multimedia content stored in the memory 16, or obtained from an external source.

The mobile telephone 10 also may include a local wireless interface 56, such as an infrared transceiver and/or an RF adaptor (e.g., a Bluetooth adapter), for establishing communication with an accessory, another mobile radio terminal, a computer or another device. For example, the local wireless interface 56 may operatively couple the mobile telephone 10 to a headset assembly (e.g., a PHF device) in an embodiment where the headset assembly has a corresponding wireless interface.

The mobile telephone 10 also may include an I/O interface 36 that permits connection to a variety of I/O conventional I/O devices. One such device is a power charger that can be used to charge an internal power supply unit (PSU) 38. Mobile telephone 10 also may include a timer and a media player as are conventional.

Figure 9:
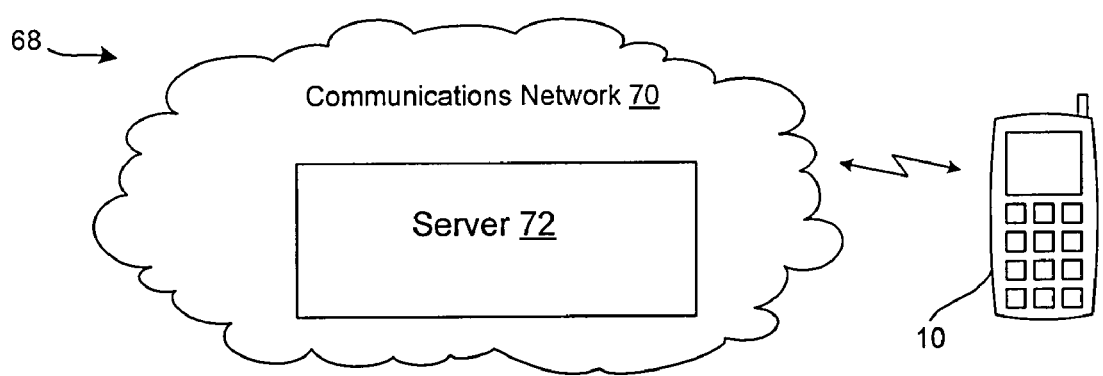
FIG. 9 is a schematic diagram of a communications system in which the mobile telephone of FIG. 1 may operate.

Referring to FIG. 9, the mobile telephone 10 may be configured to operate as part of a communications system 68. The system 68 may include a communications network 70 having a server 72 (or servers) for managing calls placed by and destined to the mobile telephone 10, transmitting data to the mobile telephone 10 and carrying out any other support functions. The server 72 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 70 may support the communications activity of multiple mobile telephones 10 and other types of end user devices. As will be appreciated, the server 72 may be configured as a typical computer system used to carry out server functions and may include a processor configured to execute software containing logical instructions that embody the functions of the server 72 and a memory to store such software.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. An electronic device comprising:
an event table for storing timed events, wherein for each timed event the event table includes a tolerance period indicating a time period from a trigger within which to execute the timed event, and a respective timestamp indicating a scheduled execution time for the timed event; and
a controller configured to receive a trigger at a trigger time, and further configured upon receiving the trigger to execute a plurality of timed events in the event table each for which the respective timestamp is within the tolerance period as measured from the trigger time,
wherein the controller is further configured to sort the timed events in the event table from a shortest tolerance period to a longest tolerance period, and the events are executed in sorted order of tolerance period.

2. The electronic device of claim 1, further comprising a timer handler for generating entries of timed events in the event table.

3. The electronic device of claim 2 further comprising a scheduler comprising the event table and the timer handler.

4. The electronic device of claim 2, wherein the timer handler deletes from the event table entries for timed events executed by the controller.

5. The electronic device of claim 1, wherein the controller is further configured to cause the electronic device to enter a low-power sleep mode, and to cause the electronic device to return to a wake state upon receiving the trigger.

6. The electronic device of claim 5, wherein the controller is further configured to cause the electronic device to reenter the sleep mode after executing a plurality of timed events in the event table each for which the respective timestamp is within the tolerance period as measured from the trigger time.

7. The electronic device of claim 5 further comprising a hardware timer separate from the controller that measures time while the electronic device is in the sleep mode.

8. The electronic device of claim 1, wherein the electronic device is a mobile telephone.

9. A method of executing timed events in a portable electronic device comprising the steps of:
generating an event table for storing timed events, wherein for each timed event the event table includes a tolerance period indicating a time period from a trigger within which to execute the timed event, and a respective timestamp indicating a scheduled execution time for the timed event;
receiving a trigger at a trigger time;
sorting the timed events in the event table from a shortest tolerance period to a longest tolerance period; and
executing a plurality of timed events in the event table in sorted order of tolerance period each for which the respective timestamp is within the tolerance period as measured from the trigger time.

10. The method of executing timed events of claim 9, wherein for each timed event the invent table includes a priority, the method further comprising sorting timed events having the same tolerance period from highest priority to lowest priority.

11. The method of executing timed events of claim 9 further comprising deleting the executed timed events from the event table.

12. The method of executing timed events of claim 11 further comprising retaining the non-executed events in the event table.

13. A method of operating an electronic device comprising the steps of:
generating an event table of timed events, wherein for each timed event the event table includes a tolerance period indicating a time period from a trigger within which to execute the timed event, and a respective timestamp indicating a scheduled execution time for the timed event;
entering a low-power sleep mode;
receiving a wakeup trigger at a trigger time;
powering up from the sleep mode to a wake state;
sorting the timed events in the event table from a shortest tolerance period to a longest tolerance period; and
executing a plurality of timed events in the event table in sorted order of tolerance period each for which the respective timestamp is within the tolerance period as measured from the trigger time.

14. The method of operating an electronic device of claim 13 further comprising returning to the sleep mode after executing the plurality of timed events in the event table each for which the timestamp is within the tolerance period as measured from the trigger time.

15. The method of operating an electronic device of claim 13, wherein the step of receiving the wakeup trigger comprises receiving an input from a source external to the electronic device.

16. The method of operating an electronic device of claim 13, wherein receiving the wakeup trigger comprises initiating the execution of a timed event in the event table.

17. The method of operating an electronic of claim 13, wherein the electronic device has a controller including a system clock, and the step of entering the sleep mode comprises powering down the controller and the system clock.

18. The method of operating an electronic of claim 17, wherein the electronic device has a hardware timer, the method further comprising measuring time with the hardware timer while the electronic device is in the sleep mode.

* * * * *